FTP8102 XR 3,707,679

United States Patent [15] 3,707,679

Bruley et al. X5186T [45] Dec. 26, 1972

[54] AUTOMATIC MOBILE RADIO TELEPHONE SYSTEM

[72] Inventors: Maurice Georges Marie Bruley, Paris; Pierre Ferret, Versailles, both of France

[73] Assignee: International Standard Electric Corporation, New York, N.Y.

[22] Filed: March 31, 1970

[21] Appl. No.: 24,116

[30] Foreign Application Priority Data

Dec. 2, 1969 France ....................6910036

[52] U.S. Cl. ....................325/5, 325/55
[51] Int. Cl. ....................H04b 1/40
[58] Field of Search ....................325/55, 64, 5; 343/177

[56] References Cited

UNITED STATES PATENTS

| | | | |
|---|---|---|---|
| 3,173,996 | 4/1965 | Rypinski, Jr. | 325/55 |
| 3,387,212 | 6/1968 | Kaufman | 325/55 |
| 2,848,545 | 8/1958 | Mitchell | 325/55 |
| 2,803,744 | 8/1957 | Berger et al. | 325/55 |

*Primary Examiner*—Richard Murray
*Assistant Examiner*—Barry L. Leibowitz
*Attorney*—C. Cornell Remsen, Jr., Walter J. Baum, Percy P. Lantzy, J. Warren Whitesel, Delbert P. Warner and James B. Raden

[57] ABSTRACT

An automatic mobile radio telephone system employs a number of mobile subsets interconnectable through a radio relay station. The station includes two or more duplex channels and marks a selected free channel with a tone $f_i$ and transmits at a reduced power. A calling mobile set sends out a tone $f_d$ and the relay station in response stops sending tone $f_i$ and starts transmitting tone $f_d$ at full power. Free sets in standby condition on $f_i$ catch $f_d$ and wait for the called number. Sets that are not concerned with the call search for another channel marked $f_i$ by the station, since the first said channel has been taken by the call. Signals from a set cannot be received directly by other sets, and secrecy of each communication is insured.

6 Claims, 2 Drawing Figures

PATENTED DEC 26 1972 3,707,679

Figure 1:
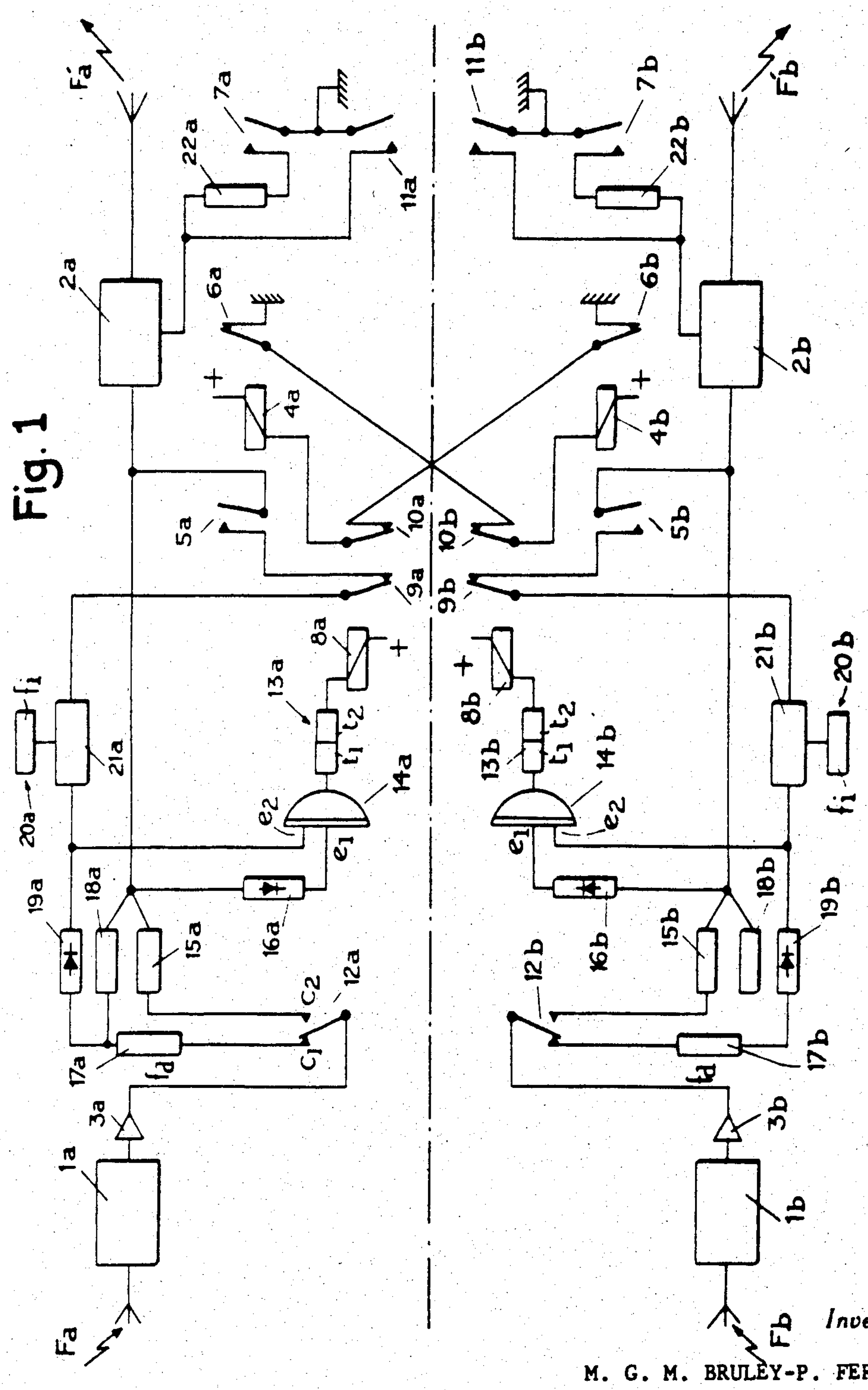

Inventor
M. G. M. BRULEY-P. FERRET
By J. G. Warner
Attorney

AUTOMATIC MOBILE RADIO TELEPHONE SYSTEM

The present invention relates to mobile radiotelephone links and systems serving a plurality of mobile and stationary sets and using an automatic relay station and several channels that can be switched to interconnect mobile or stationary sets.

Systems are already known which have multiple radio channels and allow automatic radiotelephone communications between a plurality (N) of radiotelephone sets and a public telephone network by means of several ($n$) radio channels (with $n < N$), through the use of an automatic device for selecting a radio channel marked as a free one, in order to set up a new communication. Such systems, called "party-channel systems," allow to spare a substantial number among the $n$ radio channels allotted to the mobile radio communications, whithout the statistical probability of obtaining a communication with a mobile radio set being made less than in case a radio channel were allotted to every mobile set, even in the hours of heavy traffic. There are known several systems of this kind, e.g., the "Secode" system of the American Telegraph and Telephone C° and that described in the French Pat. No. 1 497 524 filed on the 26th of May, 1966 in the same name as the present application.

These systems are quite suitable for individual users. In addition, conventional systems have long been known which apply to so-called "closed" mobile radio networks and which comprise a plurality of mobile sets and one or more stationary stations that generally operate in an alternate way. These networks, when they are spread out geographically, often make use of automatic switching stations. Systems of this kind are well suited to an officially graded network with which a large community can be interested (police, safety services, taxi-cabs). In such cases, the official telecommunication bodies can allot radio frequencies to best use and easilly adapt them to the extent of the traffic.

Neither of the two types of systems mentioned above is well suited to "closed" networks of medium size, serving small communities which are often stretched out over large geographic areas and require therefore the use of automatic relay stations. Obviously, this solution is costly when the number of sets is small.

For economic reasons, it would be of interest to group several closed networks of medium size but covering one and the same geographic area so as to make them partake of a single automatic relay station having n channels adapted to the major problems that need to be overcome if such a solution were attempted are the following. First, there should be made a good use of the allotted radiofrequencies. Then the secrecy of conversation whithin any network in the group should be secured; in other words, the system should be designed in such a way that risks of communication between sets belonging to two different networks would be very small.

For a given grade of service, the saving of equipment achieved by grouping small and medium networks and making them partake the use of several ($n$) channels by any suitable method will be evident from the following approximate figures. According to well known statistical computations, 25 radiotelephonic sets disposing of a single channel with a traffic of 0.01 erlang have 20 percent chance of finding their channel busy in the charged hour and 50 sets using two separate channels obviously have the same grade of service. However, if the two channels are party channels, the sets which would enjoy statistically the same grade of service would reach to one hundred. In case there are four channels, the number of sets could be between one and three hundred, depending on whether there would be separate channels or party channels.

Therefore, the present invention provides a telephone system which concerns a single network, or a group of several separate networks. This system serves a plurality of either mobile or stationary sets which are linked with one another through a relay station which disposes of several channels which are automatically placed at the disposal of the calling sets in accordance with need and availability.

The proposed system has some of the fundamental features of conventional networks that make use of a relay station and which employ a single radio channel set up in a high location and of course adapted to operate in duplex. The modulation circuit in the transmitter of the relay station is connected to the low frequency output of the receiver so that any message that is received on a frequency F is automatically retransmitted on another frequency (F′) which is suitably separated from the first said frequency, generally by some frequency, such that the operation of the receiver is not disturbed. In such conventional networks having a relay station, both the stationary and mobile sets are worked in an alternate way with a pair of frequencies, a transmission frequency and a reception one, which are inverted by reference to those of the relay station.

In these conventional single-channel devices, switching to the transmit state the relay station is automatically controlled either in response to the detection of the F-carrier, or to the detection of a characteristic signal in the low-frequency modulation, by means of special devices which depend from the receiver.

The proposed system is also related, in a very simplified form, to systems having multiple radio channels which are adapted to automatically set up radiotelephone communications between a plurality of radiotelephonic sets and a public network through several radio channels the busy condition of which is checked from an automatic central station which operates in transmitting a marking signal to the selectors of the radiotelephone sets that are in a standby condition and stops their search on a free channel. In the system proposed here, the relay station operates nearly like the said automatic central station.

According to a feature of the invention, the relay station comprises n pairs of fully equipped transmitters and receivers, each pair corresponding to a general use radiotelephone channel, i.e., a channel which can be used as well for marking the availability as for signalling calls and for traffic proper. In the two latter instances, the concerned transmitter in the relay station ensures retransmission of the modulation which is received by the associated receiver.

According to another feature of the invention when the n transmitters of the relay station are not operating for normal traffic, one of them sends out, with a reduced power, radio signal which is modulated by a characteristic low frequency $f_l$ called "available-frequency." This signal, after being collected in the receivers of those sets that are in a standby condition, and suitably transformed and perused, controls the stopping on an "available" channel in view of the next call, of a device for successively scanning the channels, known per se.

According to another feature of the invention, the receiver in the relay station that is associated with the transmitter which is sending out, with reduced power, on the presently available channel is kept ready to receive a call from one of the sets, such call starting with a low frequency signal $f_d$ called "relay station triggering signal." On detection of this frequency $f_d$ by the receiver in the relay station that corresponds to the available channel $a$, a switching device which operates in a very short time $t_1$ causes the transmitter of channel $a$ to turn to full power, it connects the output of said receiver to the modulation input of said transmitter of channel $a$ and lastly transfers the low-frequency availability modulation $f_i$ to another transmitter, which is put in operation with reduced power, and which corresponds to the new free channel, say $b$ , $c$ , $d$ , etc.

According to another feature of the invention, logical or gate circuits and a timing circuit are provided in each set of the system. They prohibit a set from sending out selective call through the relay station to the called set, or a called set from receiving said call, unless the availability frequency is received ; they prohibit said calling set from sending out the code number of the called set before it has transmitted, for a time longer than the above defined time $t_1$, the $f_d$ - frequency modulation which starts the normal traffic operation of the transmitter in the relay station ; they prohibit more than one calling set from using one and the same channel ; they retain the subset during a sufficient delay $t_3$ of about a few seconds and which leaves an appropriate time to the calling set for sending out the code number of the called set, before they allow the subsets which are not concerned with the call to resume the automatic search of another available channel.

According to another feature of the invention, a timing device having two times $t_1$ and $t_2$ (with $t_1 << t_2$) is provided for each channel of the relay station and adapted to bring the transmitter to its full power in time $t_1$ (smaller than 1 second) after the reception of the low frequency $f_d$ that triggers the relay station begins, and to cause it to be transmitting during a period $t_2$ of about some tens of seconds. Then the transmitter stops and is ready to be used contingently with reduced power. However, the transmitter will continue to operate with its full power during another period $t_2$ if any low frequency signal is detected by the receiver before the end of the first period.

The use of such time devices allows the sets to operate normally, in an alternate way, according to a method that is usual in networks having relay stations, while it avoids untimely triggering caused by interferences. Moreover the channel in the relay station is released after a radio silence during $t_2$ seconds.

Figure 2:
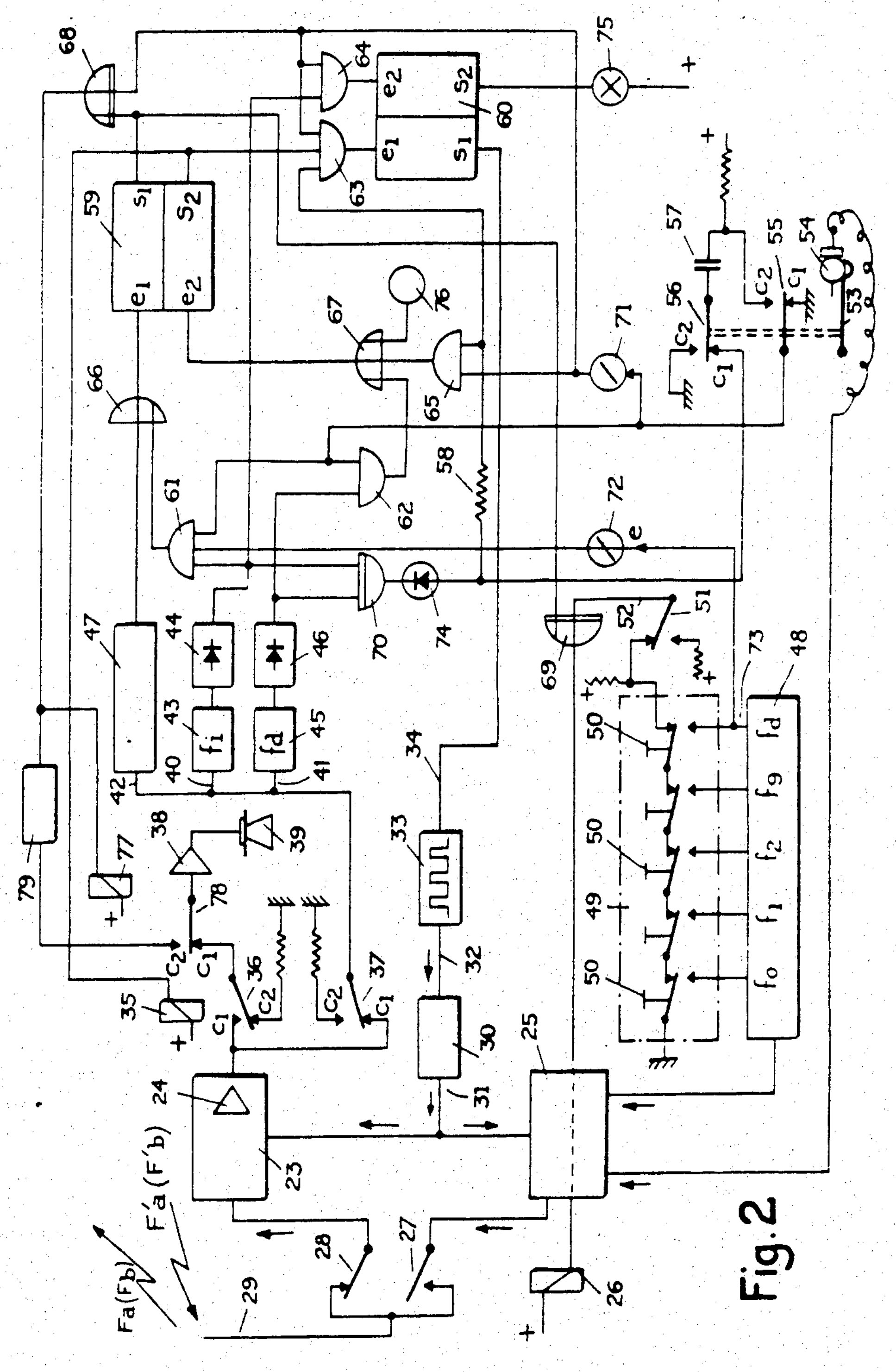

The objects and features of the present invention will appear more clearly from the description of an exemplary embodiment with two channels, this description being made with reference to the appended drawings, in which :

FIG. 1 is a block diagram of the equipment of a relay station having two party-channels, according to the invention, and FIG. 2 is a block diagram of the equipment of a set, either stationary or mobile, of the system.

In FIGS. 1, 1.*a* and 2.*a* represent respectively radio receiver and transmitter tuned to carrier frequencies F.*a* and F'.*a* that correspond to the first channel. 1.*b* and 2.*b* represent similar items tuned to carrier frequencies F.*b* and F'.*b* that correspond to the second channel. Each of receivers 1.*a* and 1.*b* is followed by a low frequency amplifier, respectively 3.*a* and 3.*b*.

The operation of transmitter 2.*a* is caused by a first relay having an energizing coil 4.*a* which operates the three contacts 5.*a*, 6.*a* and 7.*a* and by a second relay having an energizing coil 8.*a* which operates three contacts 9.*a*, 10.*a* and 11.*a* and a switching contact 12.*a*.

Energizing coil 8.*a* is fed through a time circuit 13.*a* and a logical circuit 14.*a* which forms a "NOR"-type gate. Circuit 13.*a* provides two durations $t_1$ and $t_2$, the first one, called call duration, being much shorter than the discharge duration, $t_2$.

"NOR"gate 14.*a* is characterized by the fact that its outlet will be in a "0" condition when either one of its inlets $e_1$ or $e_2$ is in condition "1".

Inlet $e_1$ of gate 14.a is fed either, from one of the switching contacts 12.*a*, through a low frequency attenuator 15.*a* and a low frequency rectifier 16.*a*, or from the other contact of switch 12.*a*, through a filter 17.*a* which is tuned to a low frequency $f_d$ called "relay station triggering frequency", a low-frequency attenuator 18.*a* and the rectifier 16.*a*, already mentioned.

Inlet $e_2$ of gate 14.*a* is fed from the outlet of filter 17.*a* through a low-frequency rectifier 19.*a*. Oscillator 20.*a* generates a low-frequency signal $f_i$ termed "availability signal." This signal passes through an analog gate 21.*a* which will be locked when 19.*a* detects a low-frequency signal $f_d$, and it is connected for modulating transmitter 2.*a* so long as contacts 5.*a* and 9.*a* are both closed.

Transmitter 2.*a* is fed with direct voltage through either of contacts 7.*a* or 11.*a*. A voltage reduction part 22.*a*, which can be formed of a simple resistor, is inserted between 7.*a* and the inlet of transmitter 2.*a*.

All parts of the second channel are identical with those of the first one and are represented in the lower portion of FIG. 1 through same symbols and numbers as the corresponding parts of the first channel, but with an index *b* instead of *a*.

All of the relays, logical or analog gates, oscillators, filters, attenuators, detectors, numerous embodiments of which are well known in the art, will not be described here. Receivers 1.*a*, 1.*b* as well as transmitters 2.*a*, 2.*b* are of a conventional type, and the choice of their features also is dependent on design devised by a practitioner skilled in the art, after due consideration of transmission power requirements as determined in dependence on the extent of the network and the local propagation conditions.

Without anticipating the detailed operation of the sets in the network, which will be described herebelow, the operation of a relay station according to the invention can be explained with reference to FIG. 1.

Before a relay station is started, all the contacts and switches operated by relays 4.*a* and 4.*b*, 8.*a* and 8.*b*, assume the position shown in FIG. 1. When the station is cut in, one of the controlled relays 4.*a*, 4.*b* is set, thus causing the other to remain at rest. This is because when 4.*a* is energized, contact 6.*a* opens, so that the energizing coil of relay 4.*b* cannot be fed with current. Transmitter 2.*a* is fed since contact 7.*a* is closed, yet with a reduced voltage because of the reduction circuit 22.*a* being there. Oscillator 20.*a* generates the low-frequency availability signal $f_i$. This signal passes through the analog gate 21.*a*, contact 9.*a*, the now closed contact 5.*a* and comes to modulate transmitter 2.*a* which then transmits a carrier frequency F'.a modulated with $f_i$. This transmission is effected now with a reduced power since reduction circuit 22.*a* is inserted in the feed voltage input. Relay 8.*a* remains at rest through all this time.

When a radiotelephone set of the system calls another set, it sends out, as will be described hereinafter, a low-frequency signal $f_d$, called "relay station triggering signal," on channel *a* and the carrier frequency F.*a*, during a time *t* of at least 500 mS. This signal is received by 1.*a*, amplified by 3.*a*, filtered in 17.*a* and detected in 19.*a*. It then locks gate 21.*a*, which stops transmitter 2.*a* transmitting with a modulation at frequency $f_i$. At the same time, said signal at frequency $f_d$ passes through attenuator 18.a and is led into the modulator of transmitter 2.*a*. Thus, transmitting with a modulation $f_i$ is replaced by the re-transmitting with a modulation $f_d$ on the carrier frequency F'.*a*.

"NOR" gate 14.*a*, which bore a condition "0" at both its inlets $e_1$ and $e_2$ before the low-frequency signal $f_d$ went, and therefore a condition "1" at its outlet, is now marked, upon said signal coming, with a condition "1" at one of its inlets ($e_2$), and therefore a condition "0" at its outlet. Consequently, after a delay $t_1$, e.g., 500 mS, which corresponds to the charge time in the time circuit 13.*a*, the coil of relay 8.*a* is energized. Contacts 9.*a* and 10.*a* open while 11.*a* closes. Energizing coil 4.*a* is no longer fed and contacts 5.*a* and 7.*a* open while 6.*a* closes. Switch 12.*a* rocks from contact at $C_1$ to contact at $C_2$. All these shifts of contacts have the following effects:

transmitter 2.*a* is brought to its full power since the reduction part 22.*a* is cut off from the direct voltage feed circuit;

switch 12.*a* being in position $C_2$, signals coming through receiver 1.*a* and amplifier 3.*a* are no longer filtered in 17.*a* and are led into the modulator of transmitter 2.*a* after attenuation in 15.*a*;

contacts 6.*a* and 10.*b* being closed, relay coil 4.*b* in channel *b* is fed, and transmitter 2.*b*, operated after the process described above, transmits with reduced power, a radio signal on carrier frequency F'*b* modulated with the low frequency $f_i$ which is generated by oscillator 20.*b*.

With transmitter 2.*a* operating with its full power, a link is set up, through the relay station, between the calling set and the called one, after a process which will be described hereinafter.

Of course, this link can stand only so long as relay coil 8.a is fed with current. Now, the time circuit 13.*a* begins to discharge as soon as the outlet of gate 14.*a* returns to condition "1". The time $t_2$ of the discharge is long about 30 S. At the end of this time, coil 8.*a* is no longer fed. However, during the communication between the two radiotelephone sets on channel *a*, through the relay station, the "NOR" gate 14.*a* has both its inlets in a "0" condition, and thus its outlet in a "1" condition, only during the short moments when the conversation is interrupted. As these moments are much shorter than $t_2$, coil 8.*a* stays fed.

At the end of the communication between the two radiotelephone sets, as any tangible signal is no longer detected by 16.*a*, the condition of gate 14.*a* is marked with "0" at both its inlets and "1" at its outlet. Then after a time $t_2$ of about 30 S., coil 8.*a* is no longer fed, so that contacts 9.*a* and 10.*a* close, contact 11.*a* opens and switch 12.*a* returns to position $C_1$. From this time, relay coil 4.*a* is not fed neither provided, contact 6.*b* is open which means that transmitter 2.*b* transmits, with reduced power, the carrier F'.*b* modulated with the low-frequency availability signal $f_i$. In this case, transmitter 2.*a* returns to rest and is ready to be put again into availability condition with a reduced power as soon as channel *b* will be busied with a conversion between two radiotelephonic sets.

If, on the contrary, contact 6.*b* is closed, which means that transmitter 2.*b* operates with its full power, relay coil 4.*a* is fed again at the end of the time $t_2$, and transmitter 2.*a* returns to operation with a reduced power, after the process which was described above.

Of course, the relay station may comprise more than two channels, say n channels, each comprising a receiver and a transmitter. Generally speaking, each channel must be provided with $n - 1$ relays such as 4.*a*, each controlling the voltage supply in one of the $n - 1$ other transmitters in the relay station. The relay station can also comprise but a single channel. The stationary part of contact 10.*a* will then be connected to ground. Otherwise, the operation will be the same as described above.

The radiotelephone set according to the invention, which is shown in FIG. 2, is of the alternate type and comprises, on the one hand, a receiver 23 which ends with a low-frequency amplifier 24, and, on the other hand, a transmitter 25. The relay coil 26 which operates contacts 27 and 28 can switch the antenna 29 from the transmission position to the reception position. Receiver 23 and transmitter 25 are tuned to one of the channels provided in the relay station by means of a ring counter 30 the output of which is connected to crystal oscillators in receiver 23 and transmitter 25 according to a well known technique.

The inlet 32 of counter 30 is connected to a clock pulse generator 33 which supplies e.g., 10 pulses per second, so as to let receiver 23 and transmitter 25 stay about 100 mS. on each channel during the search of the availability low-frequence $f_i$ which may be transmitted by the relay station. The clock pulse generator 33 is operating when a control marking is applied at its inlet 34.

A relay coil 35 operates two two-position contacts 36 and 37 which switch the output of amplifier 24. Switch 36 either prevents or allows a connection of 24 with a low-frequency power amplifier 38 coupled to a listening-in device e.g., a loud speaker 39. Switch 37 either prevents or allows a connection of 24 with three parallel paths 40, 41 and 42. Path 40 passes through a filter 43 tuned to the availability low frequency $f_i$, and followed by a detector 44; path 41 passes through a filter 45 tuned to the relay station triggering low-frequency $f_d$, and followed by a detector 46; the last path 42 leads to a decoder 47, of a known type, for the call number allotted to the radiotelephonic set considered.

Transmitter 25 can be modulated by the low frequencies yielded by the oscillator unit 48 which is controlled by a keyboard 49 having eleven keys 50 (only five of them are represented in FIG. 2). The ten first keys correspond to the ten low frequencies $f_0, f_1, f_2 \ldots f_9$ which represent, according to a known method, the decimal numerals 0 to 9, and the eleventh key corresponds to the relay station triggering low frequency $f_d$. The alternate-operating pedal is shown at 51. Keys 50 and alternate pedal 51 are associated with two position switches that can be seen in FIG. 2. When all these switches are in their upper position, output 52 of the alternate pedal is connected to ground (or 0 potential), whereas when one of said switches is in its lower position, outlet 52 is at a positive potential. The switching hook 53 associated with the microphone 54 of the radiotelephonic set operates two switches 55 and 56 each having two positions. Switch 56 is connected to the one armature of a condenser 57 having a large capacity C. The other armature of said condenser is connected to a direct voltage source. A resistor 58 having a value R defines, together with the capacity C of 57, a time constant $t_3$ equal to RC.

The operation of the signalling device in the radiotelephonic set is determined by an arrangement of logical circuits or "gates" and of logical circuits having a memory feature. These circuits will be fisrt cited before explaining the operation of the arrangement. The connection of the various logical circuits with the ones the others and with the circuits already described are shown in FIG. 2.

In the following description, it will be said that the inlet or the outlet of a logical circuit is equal to "1" or is in the "1" condition when this inlet (or outlet) is at a positive potential near electro-motive force E of the supply source ; and that it is null, or equal to "0", or else in "0" condition, in the other case, that is when it is at a "0" potential, or at a positive potential, plainly lower thant $E_O$.

The logical circuits 59 and 60, having a memory feature, have two inlets $e_1$ and $e_2$. $e_1$ is a writing-in inlet and $e_2$ an erasing inlet. In accordance with the principle of the operation of these circuits, when a signal "1" is applied to inlet $e_1$, the inlet $e_2$ being marked "0", condition "1" comes out at outlet $s_1$. Inlet $e_1$ can then return to condition "0", outlet $s_1$ will keep value "1" written in. In this situation, when the erasing inlet $e_2$ is brought to condition "1", outlet $s_1$ is reset into condition "0" and stays so even when inlet $e_2$ returns to condition "0".

Circuits of this kind must be so designed that condition "1" would appear at both inlets $e_1$ and $e_2$ at the same time. Practically, such circuits are well known in the technique where they are to be found in form of bistable multivibrators or two-inlet flip-flops. They provide of course beside outlet $s_1$ an outlet $s_2$ the condition of which is contrary to that of outlet $s_1$. In the continuation of the present disclosure, 59 and 60 will be designed as "flip-flops." They are considerable parts, because 59 sets a condition to the start and operation of the set for originating and terminating calls, and 60 sets a condition to operation and stops of the clock pulse generator 33.

Logical circuits 61 to 65 are "AND" gates. The output of each of them is "1" only when all its inlets are in "1" condition. Logical circuits 66 and 67 are "OR" gates. The output of either is "1" when at least one of its inlets is in "1" condition. Logical circuits 68 and 69 are "NAND" gates. The output of either is "0" only when all its inlets are in "1" condition. Logical circuit 70 is a "NOR" gate. Its outlet is "0" when at least one of its inlets is in "1" condition. Logical circuits 71 and 72 are "NOT" gates. The condition of their outlets are the contrary of the condition of their inlet.

Inlet $e$ of circuit 72 is connected at 73 to the inlet $f_d$ of the oscillator unit 48. Diode 74 operates as an unidirectional part. It is set at the outlet of logical circuit 70 and prevents condenser 57 from a quick discharge through gate 70. Output $s_2$ of flip-flop 60 controls the lighting of a lamp 75 called "busy-signalling lamp."

Circuit 76, which is connected to one inlet of "NOR" gate 67, is a conventional resetting circuit for flip-flop 59. It operates when the set is out in. The outlet of gate 68 is connected to a relay coil 77 which operates a switch 78 having two positions, $C_1$ and $C_2$. The outlet of gate 68 is also connected to a signalling oscillator 79 which generates a tune when the outlet of 68 is in the "0" condition. This tune can be heard in loud-speaker 39 when switch 78 is in its upper position $C_2$.

All of the relays, logical circuits, flip-flops, oscillators, amplifiers, filters, detectors, the numerous embodiments of which belong to the artsman, will not be described here. Receiver 23 and transmitter 25 as well as clock pulse generator 33, ring counter 30 are of a conventional type for their main parts, and the choice of their particulars also depends on the artsman's sense.

Condition and/or operation of the signalling and controlling devices in the radiotelephonic set according to the invention will now be disclosed in the four following instances :

a. the set is in a standby condition,
b. the set proceeds with a call (originating call),
c. the set receives a call (terminating call),
d. the set is not concerned with a call.

a. the set is in a standby condition.

When the equipment is out in, condition "1" is set at inlet $e_2$ of flip-flop 59 by a short positive pulse obtained from the resetting device 76 and which operates in applying a "1" condition to one inlet of the "OR" gate 67. Since switching hook 53 carries microphone 54, switch 55 is in its lower position $C_1$, so that a "0" is applied to one inlet of "AND" gate 61 and therefore a "0" is applied to one inlet of "OR" gate 66. As the outlet of decoder 47 is in a "0" condition, the other inlet of 66 is also in a "0" condition. Therefore, the outlet of 66 as well as inlet $e_1$ of flip-flop 59 are in a "0" condition, so that the outlets of the latter $s_1$ and $_2$ are respectively "0" and "1".

When receiver 23 is in a standby position on a free channel, the low-frequency availability signal $f_l$ which is sent out from the relay station comes out at the outlet of filter 43. This signal, after its being detected by 44, applies marking "1" onto one inlet of "AND" gate 64. Switch 55 being in its lower position, a "1" marking is also applied due to the action of the "NOT" gate 71 to the other inlet of gate 64. This results in inlet $e_2$ of flip-flop 60 being in the "1" condition. Owing to a like process regarding the inlets of "AND" gate 63, it will be seen that one of its inlets is in a "0" condition, so that inlet $e_1$ of flip-flop 60 also is in a "0" condition. This being so, outlet $s_1$ of the said flip-flop is marked "0" and the clock pulse generator 33 which controls searching a free channel is locked. Outlet $s_2$ of flip-flop 60 is in the "1" condition, and the busy-signalling lamp 75 is out.

b. the set proceeds with a call (originating call)

When the user of a radiotelephonic set wants to make a call, he unhooks his microphone 54 after having ascertained that lamp 75 is out. Switches 55 and 56 then come into their upper position $C_2$, which causes condition "1" to be applied to one inlet of "AND" gate 61. The availability low frequency $f_l$ is present since lamp 75 is out, so that another inlet of gate 61 is in the "1" condition.

The operator then presses key 50 of keyboard 49, that corresponds to the relay station —triggering low-frequency $f_d$, during a time longer than 500 mS. Through the "NOT" gate 72, marking "1" is transmitted to the third and last inlet of "AND" gate 61. The outlet of the latter then turns to the "1" condition, and the same "1" condition is applied through "OR" gate 66 to inlet $e_1$ of flip-flop 59. In that time, the other inlet $e_2$ of said flip-flop 59 is switched to the "0" condition owing to the three inlets of "OR" gate 67 are marked "0". This being so, outlet $s_1$ of 59 turns to the "1" condition and outlet $s_2$ of same to the "0" condition.

Still in that time, owing to one inlet of each of "AND" gates 63 and 64 being marked "0" by means of "NOT" gate 71, inlet $e_2$ of flip-flop 60 turns back to "0" condition while the other inlet $e_1$ stays in its "0" condition. This being so, the outputs from 66 stand unchanged.

Both inlets of "NAND gate 69 turn to "1" condition, so that its output becomes "0". Transmission relay 26 is operated, and tranmitter 25 sends out a radio signal modulated with the $f_d$ frequency. Considering now relay coil 35, it can be seen that it is fed since outlet $s_2$ of flip-flop 59 is marked "0". Therefore, switches 36 and 37 rock into their upper position $C_2$, and loudspeaker 39 is ready to operate.

At the relay station side, as it has been seen above, receiving frequency $f_d$ causes one of transmitters 2.*a* and 2.*b* (see FIG. 1) to be switched to its full power after a delay of about 500 mD. This transmitter then sends out, towards sets in the standby position on the available channel, the radio signal modulated with the $f_d$ frequency.

As soon as the operator releases key 50 that corresponds to the $f_d$ frequency, he sets up the number of the called set in successively pressing the suitable keys of keyboard 49. Each key pressing must last at least 500 mS. for operation safety reasons. Each time a key is pressed, a "0" condition appears at the outlet of gate 69 and relay 26 is operated. Each key also controls one of the oscillators that yield the low frequencies $f_0, f_1, f_2$ . . . *and 9* and which are comprised in unit 48. These frequencies $f_0, f_1, f_2$ . . . or $f_9$ act in modulating the output of transmitter 25, so that the latter sends towards the relay station the run of low-frequencies $f_0, f_1, f_2$ . . . or $f_9$ that forms the code number of the called set.

The performance of the called set will be considered farther on. For the need of the present account, it will be assumed that a conversation is set up between the two sets. The outlets of flip-flop 59 in the calling set stand in one and the same condition as long as microphone 54 stays unhooked. Operations of the alternate pedal only change the output of gate 69.

At the end of the conversation, when the microphone in the calling set is hooked again, one inlet of "AND" gate 65 turns to condition "1" owing to the "NOT" gate 71. The other inlet of said gate 65 is also in the "1" condition for both inlets of "NOR" gate 70 become marked "0" at the time of the first operations in the call, when switch 56 was put into its upper position $C_2$ and as soon as the low frequencies $f_l$ and $f_d$ vanished in paths 40 and 41, so that the outlet of said gate 70 took up the "1" condition ; and this condition was applied at once to one inlet of the "AND" gate 65 through resistor 80 since condenser 57 was disconnected therefrom.

Therefore, both inlets of "AND" gate 65 are in the "1" condition as soon as the microphone is hooked back, condition "1" turns out at the outlet of said gate 65 and this condition reaches inlet $e_2$ of flip-flop 59 through "OR" gate 67. Outlets $s_1$ and $s_2$ of this flip-flop assume respectively the conditions "0" and "1". Relay coil 35 is no longer fed, and switches 36 and 37 resume their lower position $C_1$.

Besides that, it can be stated that the three inlets of "AND" gate 63 are in the "1" condition, whereas one inlet of gate 64 is in the "0" condition Therefore, flip-flop 60 changes its condition, marking "1" turns out at its outlet $s_1$ and clock pulse generator 33 resumes its working and controls a search for an available channel by receiver 23 and transmitter 25, by means of the ring counter 30. As outlet $s_2$ of flip-flop 60 is in the "0" condition lamp 75 is lit during this search.

When receiver 23 reaches a free channel which is signalled from the relay station by the availability frequency $f_l$, this frequency operates in path 40, filter 43 and detector 44. Marking "1" turns out at the outlet of detector 44 and is applied to one inlet of "AND" gate 64. The other inlet of gate 64 is also marked "1" from "NOT" gate 71, together with the corresponding inlets of gates 65 and 63, as stated above. Thus, "AND" gate 64 has both its inlets in the "1" condition. Marking "1" from detector 44 is also applied to an inlet of "NOR" gate 70 which is locked thereby, so that its outlet turns to a "0" marking. The marking "0" is applied to one inlet of "AND" gate 63 through resistor 58, this effect being slowed by condenser 57 which is now connected to resistor 58. The outlet of gate 63 thus assumes the " 0" condition. Therefore, inlets $e_1$ and $e_2$ of flip-flop 60 assume respectively conditions "0" and "1". Outlet $s_1$ of this flip-flop assumes the "0" condition. Clock pulse generator 33 stops, and lamp 75 goes out. The set resumes its initial condition of stand-by on a free channel.

In case of an originating call, mistakes may occur in the handling by the operator, or else two sets may call at one and the same time. The troublesome consequences of such peculiar circumstances will be avoided owing to the devices of the invention, described till now, and especially owing to the fact that "AND" gate 61 cannot open unless its three inlets are in condition "1".

Assuming that a first set which wants to make a call is long in pressing key 50 (that controls the sending out of frequency $f_d$) after the microphone has been unhooked, "AND" gate 61 of said first set will not open, and nothing will occur in the switching device. If on the other hand, a second set unhooks its microphone nearly at the same time and presses key 50 (which controls transmission of $f_d$) sooner than the first set, that second set will obtain the use of the free channel. The "same time," condition is defined by 500 mS, which corresponds to delay time $t_1$ of circuit 13.a in the relay station (see FIG. 1). If the two considered sets press key 50 that controls sending out of $f_d$ with a time difference of less than 500 mS, the one or the other will obtain the channel, depending on the more or less quick opening or closing of the different gates which control the signalling circuits. The probability of two simultaneous calls, such as defined above, is moreover very small.

The three-inlet "AND" gate 61 which prohibits two sets to make simultaneous calls, or a set to transmit on a channel which is already occupied by two other correspondents, in an important part which secures secrecy of the conversations.

c. The set receives a call (terminating call)

When a terminating call comes in, receiver 23 of the called set, which was detecting the availability low frequence $f_i$, comes to detect the relay station-triggering low-frequency $f_d$. Flip-flop 59 remains at rest, with a "0" marking at outlet $s_1$. When decoder 47 knows the own call number of its set, condition "1" comes out at the outlet of "OR" gate 66, and outlets $s_1$ and $s_2$ of flip-flop 59 turns respectively to condition "1" and condition "0" As "NAND" gate 68 has both its inlets in the "1" condition, its output becomes "0", and relay coil 77 is fed. The sound-signalling oscillator 79 starts working, switch 78 rocks into its upper position $C_2$, and loud-speaker 39 yields a sound signal of call. At the end of the decoder signal, inlet $e_1$ of flip-flop 59 returns to "0", which however does not change condition "1" at outlet $s_1$ so long as marking "1" is not applied to other inlet $e_2$. When the called set has its microphone unhooked, a marking "1" appears at the outlet of "-NAND" gate 68, switch 78 returns to its lower position $C_1$ and the call ringing stops. The called set can begin the communication with the calling set according to the process described above in section (b) with regard to the operation of the calling set.

If the called set does not unhook, and the low-frequency signals $f_1$ and $f_d$ having vanished, condition "1" sets up at the outlet of "NOR" gate 70, and after a delay $t_3$ of a few seconds, corresponding to the time constant RC of condenser 57 and resistor 58, the same condition "1" reaches one inlet of "AND" gate 65. As the outlet of 65 is also in condition "1", the marking "1" extends through "OR" gate 67 up to inlet $e_2$ of flip-flop 59. Outlets $s_1$ and $s_2$ of the latter assume respectively conditions "0" and "1". It can be stated that the three inlets of "AND" gate 63 are then in condition "1", whereas one inlet of "AND" gate 64 is in condition "0". This results in outlets $s_1$ of flip-flop 60 turning to condition "1". Clock pulse generator 33 is started again, and the search for a free channel resumes as already described.

d. The set is not concerned with the call.

When a set is calling, all sets that are in standby position on the free channel receive the availability low-frequency $f_i$ and then, after $f_i$ having vanished, the relay-station triggering low frequency $f_d$. Until the called set has not known, by means of its decoder 47, that the call is addressed to it, its performance is not different from that of the other sets. The respective performances change thereupon. Flip-flop 59 stays at rest (with $s_1$ in "0" condition) in the sets that are not concerned with the call, and after a delay $t_3$ of a few seconds, that of the above defined constant RC, flip-flop 60 is again switched to work position according to the process described above, and the search for a free channel is resumed.

Although the principles of the present invention have been described hereinabove with a reference to a particular example of embodiment, it will be clearly understood that the said description has been only made by way of example and does not limit the scope of the invention.

What we claim is:

1. A radio telephone system comprising an automatic radio relay station functioning as a repeater, a plurality of radio telephone stations incorporating transceivers for communicating among themselves by means of said radio relay station, said automatic radio relay station including a plurality of duplex radio channels each having a receiver and a transmitter operable respectively at a reception radio frequency and a transmission radio frequency, each radio telephone station transceiver including a receiver and a transmitter tunable to correspond to any duplex channel in said radio relay station, each called radio telephone transceiver including means to use the same transmitting carrier frequency and the same receiving carrier frequency as the corresponding calling radio telephone transceiver, the said transmitting and receiving frequencies being respectively identical with the receiving and transmitting frequencies of the relay-station channel which was available when the said calling radio telephone transceiver started its call, means enabling each channel in the relay station to be occupied by selective calls between two mobile stations, means causing an idle one of the channels in the relay station to transmit an availability signal to indicate the availability of that channel for calls, the availability signal including the channel transmission frequency modulated by a low frequency signal and transmitted at a power level reduced below the full power level, said radio telephone stations including means to cyclically scan the available channels by automatically switching pairs of frequencies, said radio telephone stations including means to stop the scanning in response to detection of the low frequency indicating an available channel, said radio telephone station including means by which it is enabled to transmit a relay trig-gering signal upon receipt of the availability signal, said relay triggering signal comprising a radio-frequency modulated with a low frequency which initiates the triggering of the relay station, means in the receiver of said relay station adapted to cause a switching de-vice to operate when said relay triggering signal is detected by the receiver in the unit that corresponds to the available channel, said switching device operating to turn the associated transmitter to its full power and to connect the outlet of said receiver to the modulation inlet of said transmitter and to transfer the low fre-quency modulation which features availability to another one of the non-occupied channels which last said channel then becomes the new available channel at the relay station, the receiver of said relay station including means to cause a switch-ing device to operate when said signal is received, said switching device turning the associated transmitter on to its full power and connecting the outlet of said receiver to the modulation inlet of said transmitter and transferring the low frequency modulation which indicates availability to another unoccupied channel, which last said channel then becomes the new available channel.

2. A system according to claim 1, wherein each transmitting and receiving unit in the relay station includes a time circuit providing two delays, a short one, of less than a second, and a long one, of some tens of seconds, the short delay time corresponding to the delay for starting the transmitter of the available channel with its full power after the beginning of the detection of the low frequency that initiates the triggering of the relay station, whereas the long delay time corresponds to a time interval from the beginning of the full-power start of the transmitter to its return to full rest condition, said transmitter however being adapted to be retained in its full-power operation during another delay when any low-frequency signal is detected before the first long delay ends by the receiver which is associated with the channel considered, this process being possibly renewed for a third long delay, a fourth one and so on.

3. A system according to claim 1, in which each radio telephone station is provided with two logical circuits having a memory feature, the first circuit being adapted to be set when the operator of the set wants to transmit over an available channel and to connect his listening means to the outlet of his receiver, the second circuit being adapted, when it is set, to control the starting of the device for cyclically scanning the channels, and logic gate means provided to prevent the two said memory circuits from simultaneously assuming a set condition.

4. A system according to claim 3, in which the first said logical memory circuit is set, in case of a terminating call, when a decoder has automatically allowed the considered set to known its own call number in a coded form; and wherein the said first logical memory circuit's being set, in combination with the switching hook's staying rest, is adapted to control, by means of a logical gate, the triggering of a ring signal sent out by a listening-in device.

5. A system according to claim 3, wherein the second said logical memory circuit is only set, in case of a terminating call, at the end of a delay of a few seconds after the beginning of the detection of the low frequency which features the triggering of the relay station, said delay being defined by the time constant of a suitably determined resistance-capacity circuit associated with a blocking diode.

6. A system according to claim 3, wherein the switching of the first said logical memory circuit to its set condition, in case of an originating call, is caused by the opening of a three-inlet logical gate of the "AND" type, a first inlet being supplied with a direct voltage derived from rectifying the low frequency signal which features the availability, a second inlet being supplied with a direct voltage which comes out when the operator of said set lets the switching hook rock up, and the third inlet being supplied with a direct voltage which comes out when the operator causes, by any suitable means, the low-frequency signal featuring the triggering of the relay station to be sent out, said logical gate of the "AND" type being adapted only to open when its three inlets are supplied at the same time.

* * * * *